(12) United States Patent
Jang

(10) Patent No.: US 10,452,075 B2
(45) Date of Patent: Oct. 22, 2019

(54) METHOD AND APPARATUS FOR GENERATING AUTONOMOUS DRIVING ROUTE

(71) Applicant: Samsung Electronics Co., Ltd., Suwon-si (KR)

(72) Inventor: Cheolhun Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 15/630,785

(22) Filed: Jun. 22, 2017

(65) Prior Publication Data
US 2018/0150082 A1 May 31, 2018

(30) Foreign Application Priority Data

Nov. 30, 2016 (KR) .................. 10-2016-0161138

(51) Int. Cl.
*G05D 1/00* (2006.01)
*G05D 1/02* (2006.01)
(Continued)

(52) U.S. Cl.
CPC .......... *G05D 1/0246* (2013.01); *B60W 10/06* (2013.01); *B60W 10/20* (2013.01); *B60W 10/22* (2013.01); *B60W 30/12* (2013.01); *B60W 30/143* (2013.01); *B60W 40/11* (2013.01); *G05D 1/0088* (2013.01); *G06K 9/00* (2013.01); *G06K 9/00798* (2013.01); *G06K 9/00805* (2013.01);
(Continued)

(58) Field of Classification Search
CPC .. G05D 1/0246; G05D 1/0088; G05D 1/0253; G05D 1/0891; G05D 2201/0213; B60W 10/06; B60W 10/20; B60W 10/22; B60W 30/12; B60W 30/143; B60W 40/11; B60W 2420/42; B60W 2520/16; B60W 2720/16; G06K 9/00798; G06K 9/00805; G06K 2009/485
USPC ........................................................... 701/28
See application file for complete search history.

(56) References Cited

U.S. PATENT DOCUMENTS 5,615,116 A * 3/1997 Gudat ................ B60K 31/0008
180/167
7,797,062 B2 9/2010 Discenzo et al.
(Continued)

FOREIGN PATENT DOCUMENTS

DE 10 2014 226 439 A1 6/2016
EP 2 246 664 A1 11/2010
(Continued)

OTHER PUBLICATIONS

European Office Action dated Feb. 27, 2018 in corresponding European Patent Application No. 17184256.0 (11 pages in Englsih).
(Continued)

*Primary Examiner* — Gertrude Arthur Jeanglaude
(74) *Attorney, Agent, or Firm* — Sughrue Mion, PLLC

(57) ABSTRACT

A method to generate an autonomous driving route of an autonomous vehicle includes: receiving an input image of a front view captured from the autonomous vehicle; calculating a gradient between the autonomous vehicle and a ground based on the input image; and generating the autonomous driving route based on the calculated gradient.

27 Claims, 17 Drawing Sheets

Vehicle traveling direction

(51) Int. Cl.
- *B60W 30/12* (2006.01)
- *B60W 40/11* (2012.01)
- *B60W 10/06* (2006.01)
- *B60W 10/20* (2006.01)
- *B60W 10/22* (2006.01)
- *B60W 30/14* (2006.01)
- *G06K 9/00* (2006.01)
- *G06K 9/48* (2006.01)

(52) U.S. Cl.
CPC ..... *B60W 2420/42* (2013.01); *B60W 2520/16* (2013.01); *B60W 2720/16* (2013.01); *G05D 2201/0213* (2013.01); *G06K 2009/485* (2013.01)

(56) References Cited

U.S. PATENT DOCUMENTS

| | | | |
|---|---|---|---|
| 8,630,806 | B1 | 1/2014 | Zhu |
| 9,393,966 | B2 | 7/2016 | Imai et al. |
| 2002/0087253 | A1 | 7/2002 | Jeon |
| 2009/0041337 | A1 | 2/2009 | Nakano |
| 2012/0323444 | A1 | 12/2012 | Rieger et al. |
| 2013/0103259 | A1 | 4/2013 | Eng et al. |
| 2015/0161454 | A1* | 6/2015 | Han ................ G06K 9/00798 382/104 |
| 2015/0224925 | A1* | 8/2015 | Hartmann ................ B60R 1/00 348/148 |
| 2016/0214620 | A1 | 7/2016 | Yang |

FOREIGN PATENT DOCUMENTS

| | | | |
|---|---|---|---|
| EP | 2 273 334 | A1 | 1/2011 |
| EP | 3 032 458 | A2 | 6/2016 |
| JP | 11-212640 | A | 8/1999 |
| JP | 2006-195641 | A | 7/2006 |
| JP | 2008-33781 | A | 2/2008 |
| JP | 4776570 | B2 | 9/2011 |
| JP | 5352922 | B2 | 11/2013 |
| JP | 5786753 | B2 | 9/2015 |
| KR | 10-0270523 | B1 | 11/2000 |
| KR | 10-1061066 | B1 | 8/2011 |
| KR | 10-2014-0024771 | A | 3/2014 |
| KR | 10-1396886 | B1 | 5/2014 |
| KR | 10-2015-0007737 | A | 1/2015 |
| KR | 10-1581286 | B1 | 12/2015 |
| WO | WO 2015/035450 | A1 | 3/2015 |

OTHER PUBLICATIONS

J. Hwang, et al., "3-Dimensional Road Slope Estimation using LRF sccan in moving vehicle," *The Institute of Electronics Engineers of Korea*, Jul. 2013, pp. 1159-1161 (1 page in English, 3 pages in Korean).

* cited by examiner

310

320

330

510

520

600

1000

METHOD AND APPARATUS FOR GENERATING AUTONOMOUS DRIVING ROUTE

CROSS-REFERENCE TO RELATED APPLICATIONS

This application claims the benefit under 35 USC § 119(a) of Korean Patent Application No. 10-2016-0161138 filed on Nov. 30, 2016, in the Korean Intellectual Property Office, the entire disclosure of which is incorporated herein by reference for all purposes.

BACKGROUND

1. Field

The following description relates to a method and apparatus to generate an autonomous driving route of an autonomous vehicle, and more particularly, to a method and apparatus to calculate a gradient of a road and generating an autonomous driving route based on the gradient.

2. Description of Related Art

An autonomous vehicle recognizes an environment around the vehicle to autonomously determine a driving route during a driving, and travels independently using its own power, for example. The autonomous vehicle may reach a destination by itself while maintaining a distance from an obstacle on a route and controlling a speed and a driving direction, even if a driver does not operate a steering wheel, an accelerator, and a brake of the autonomous vehicle. For example, the autonomous vehicle may perform acceleration in a straight line section of a road and perform deceleration on a curved section of a road while changing a driving direction based on a curvature of the road.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to generate an autonomous driving route of an autonomous vehicle includes: receiving an input image of a front view captured from the autonomous vehicle; calculating a gradient between the autonomous vehicle and a ground based on the input image; and generating the autonomous driving route based on the calculated gradient.

The generating of the autonomous driving route may include: generating a bird's eye image by converting a viewpoint of the input image into a bird's eye view based on the gradient; and generating the autonomous driving route based on the bird's eye image.

The method of claim 1, may further include: correcting data acquired by sensing an ambient environment of the autonomous vehicle using the gradient, wherein the generating of the autonomous driving route includes using the corrected data.

The calculating of the gradient may include: detecting a lane marking in the input image; detecting a vanishing point of the detected lane marking based on the lane marking; and calculating the gradient based on the vanishing point.

The detecting of the vanishing point may include detecting a vanishing point closest to the autonomous vehicle, among detected vanishing points, as the vanishing point.

The calculating of the gradient based on the vanishing point may include: receiving a location of a preset vanishing point and a location of the detected vanishing point; and calculating the gradient based on a difference between the location of the preset vanishing point and the location of the detected vanishing point.

The receiving of the location of the preset vanishing point and the location of the detected vanishing point may include receiving a height coordinate of the preset vanishing point and a height coordinate of the detected vanishing point in the input image.

The height coordinate of the preset vanishing point may be a center height coordinate of the input image.

The method may further include: determining a condition of the ground based on gradients calculated at intervals of a preset period; and controlling the autonomous vehicle based on the determined condition of the ground.

The determining of the condition of the ground may include determining the condition of the ground based on a deviation between the gradients.

A non-transitory computer-readable medium may store program instructions that, when executed by a processor, cause the processor to perform the method.

In another general aspect, an apparatus to generate an autonomous driving route of an autonomous vehicle includes a processor configured to receive an input image of a front view captured from the autonomous vehicle, calculate a gradient between the autonomous vehicle and a ground based on the input image, and generate the autonomous driving route based on the calculated gradient.

The apparatus may further include: a camera configured to acquire the input image by capturing the front view from the autonomous vehicle.

The generating of the autonomous driving route may include generating a bird's eye image by converting a viewpoint of the input image into a bird's eye view based on the gradient, and generating the autonomous driving route based on the bird's eye image.

The generating of the autonomous driving route may include correcting data acquired by sensing an ambient environment of the autonomous vehicle using the gradient. The corrected data may be used to generate the autonomous driving route.

The calculating of the gradient may include detecting a lane marking in the input image, detecting a vanishing point of the detected lane marking based on the lane marking, and calculating the gradient based on the vanishing point.

The detecting of the vanishing point may include detecting a vanishing point closest to the autonomous vehicle, among detected vanishing points, as the vanishing point.

The calculating of the gradient based on the vanishing point may include receiving a location of a preset vanishing point and a location of the detected vanishing point, and calculating the gradient based on a difference between the location of the preset vanishing point and the location of the detected vanishing point.

The receiving of the location of the preset vanishing point and the location of the detected vanishing point may include calculating a height coordinate of the preset vanishing point and a height coordinate of the detected vanishing point in the input image.

The height coordinate of the preset vanishing point may be a center height coordinate of the input image.

The processor may be further configured to determine a condition of the ground based on gradients calculated at intervals of a preset period, and control the autonomous vehicle based on the determined state of the ground.

The determining of the condition of the ground may include determining the condition of the ground based on a deviation between the gradients.

In another general aspect, a vehicle control method includes: receiving an input image of a front view captured from a vehicle; calculating a gradient of the front view based on the input image; and autonomously controlling a driving operation of the vehicle based on the gradient.

In another general aspect, a vehicle control apparatus includes a processor configured to receive an input image of a front view captured from an autonomous vehicle, calculate a gradient of the front view based on the input image, and control a driving operation of the autonomous vehicle based on the gradient.

The vehicle control apparatus may further include a memory storing an instruction executable by the processor to cause the processor to receive the input image, calculate the gradient, and control the driving operation of the autonomous vehicle.

In another general aspect, a vehicle control method includes: detecting a location of a vanishing point in an image captured by a camera of a vehicle; calculating a gradient between the vehicle and a ground based on a difference between the location of the preset vanishing point and the location of the detected vanishing point; and autonomously controlling a driving operation of the vehicle based on the gradient.

The detected vanishing point may be a vanishing point of a lane marking.

The location of the detected vanishing point may include a height coordinate of the detected vanishing point, and the location of the preset vanishing point may include a center height coordinate of the image.

The controlling of the driving operation of the vehicle may include converting the image captured by the camera into a bird's eye view image based on the gradient, generating an autonomous driving route based on the bird's eye view image, and controlling the driving operation of the vehicle based on the autonomous driving route.

Other features and aspects will be apparent from the following detailed description, the drawings, and the claims.

Figure 1:
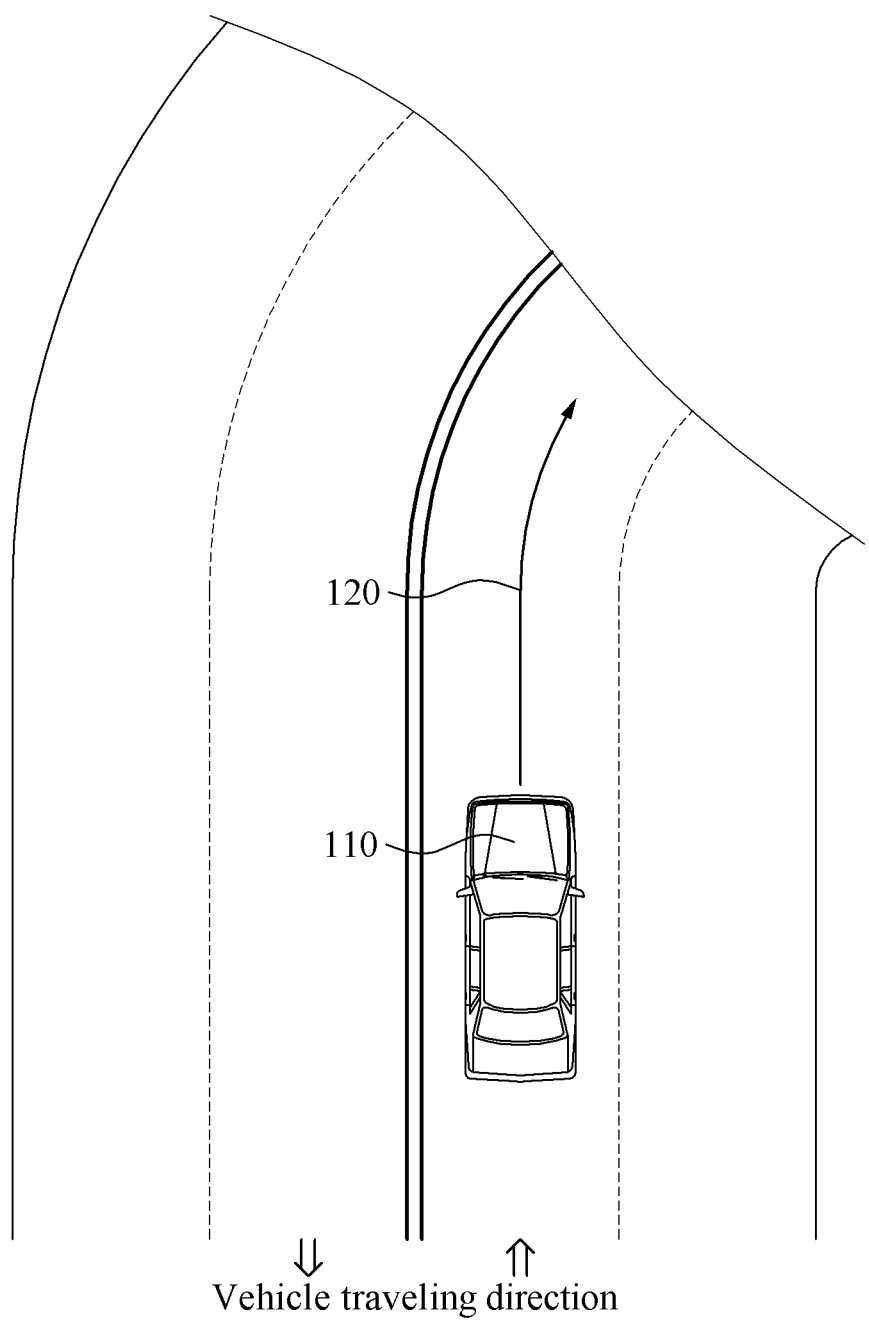
FIG. 1 illustrates an example of an autonomous vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of an autonomous vehicle 110. An autonomous vehicle, such as the autonomous vehicle 110, may be an automobile, such as a car, a truck or an SUV. Additionally, an autonomous vehicle may be a motorcycle, a drone, or a boat. However, an autonomous vehicle is not limited to the foregoing examples.

Referring to FIG. 1, the autonomous vehicle 110 travels in an autonomous mode in response to a recognized driving environment, even in a circumstance in which there is little user input, or no user input by a driver. The driving environment is recognized through one or more sensors attached to or included in the autonomous vehicle 110, such as a camera, a lidar sensor, a radar sensor, and one or more voice recognizing sensors. Other types of sensors may be used, and are considered to be well within the scope of this disclosure. The driving environment includes, for example, a road condition, a type of a lane marking, a distance from a nearby vehicle, whether a nearby vehicle is present, whether an obstacle is present, and weather, however the driving environment is not limited to the foregoing examples.

The autonomous vehicle 110 recognizes the driving environment and generates a driving route 120 suitable for the driving environment. The autonomous vehicle 110 controls mechanical elements located internal or external to the autonomous vehicle 110 to follow the driving route 120. The autonomous vehicle 110 periodically generates the driving route 120. The autonomous vehicle 110 generates the driving route 120 using a rule-based model. For example, conditions to be followed by the autonomous vehicle 110 are set in advance, and the autonomous vehicle 110 generates the optimal driving route 120 that satisfies the preset conditions. For example, one of the conditions is to observe traffic regulations.

Figure 2:
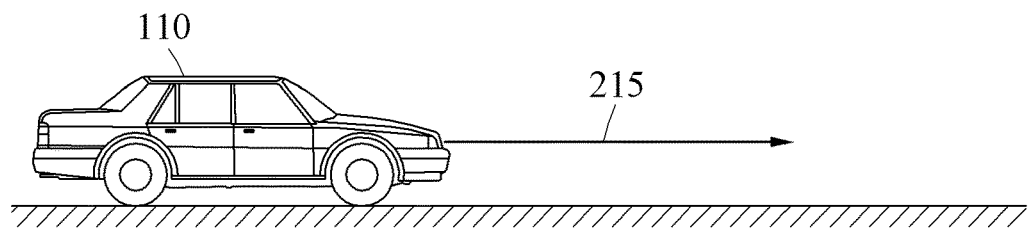
FIG. 2 illustrates an example of a bird's eye image generated in an autonomous vehicle in a stable posture.
Figure 2:
Figure 2:
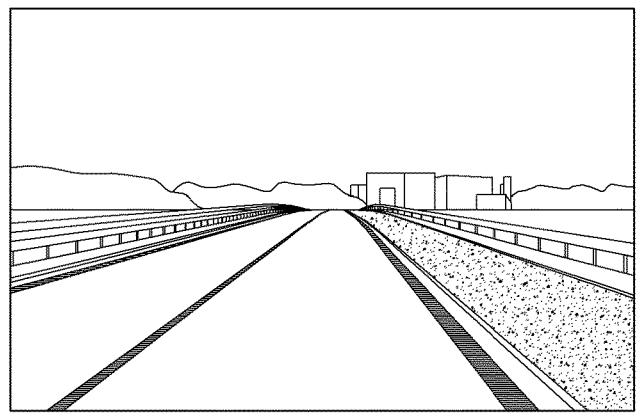
Figure 2:
Figure 2:
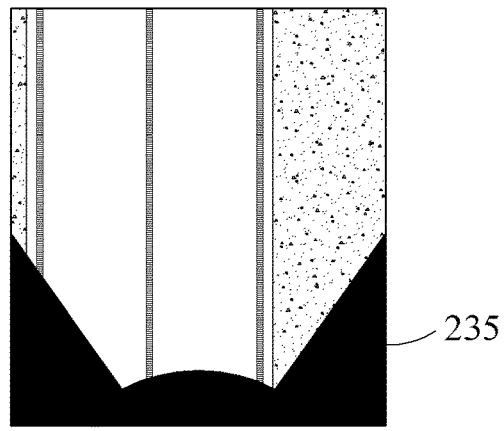

FIG. 2 illustrates an example of a bird's eye image generated in the autonomous vehicle 110, when the autonomous vehicle 110 is in a stable posture.

Referring to FIG. 2, in a case 210 in which the autonomous vehicle 110 is traveling a road, the autonomous vehicle 110 captures an image of a front view from the autonomous vehicle 110 using a camera located on a front side of the autonomous vehicle 110. In the illustrated stable posture of the autonomous vehicle 110, the camera is disposed in the autonomous vehicle 110 such that a plane of an image captured by the camera is perpendicular to a ground. The plane of the image will be described with reference to FIG. 10.

When the plane of the image captured by the camera is perpendicular to the ground, a horizon is on a center line in the captured image 220.

Still referring to FIG. 2, the autonomous vehicle 110 generates an image 230 of the front view 215 captured in a bird's eye view based on the captured image 220. Hereinafter, an image captured in the bird's eye view is referred to as a bird's eye image. The autonomous vehicle 110 generates the bird's eye image 230 by converting a viewpoint of the captured image 220 from a viewpoint of the camera to the bird's eye view. A warping technique is employed to convert the viewpoint of the image. When the captured image 220 is converted into the bird's eye image 230, pixels not corresponding to each other between the captured image 220 and the bird's eye image 230 may be present. In this example, the pixels not corresponding to each other between the captured image 220 and the bird's eye image 230 appear as a hole area 235. When generating the autonomous driving route, a presence or an absence of the hole area 235 may not be taken into consideration and thus, an additional process for the hole area 235 may not be performed. The autonomous vehicle 110 generates a driving route based on the bird's eye image 230.

Figure 3:
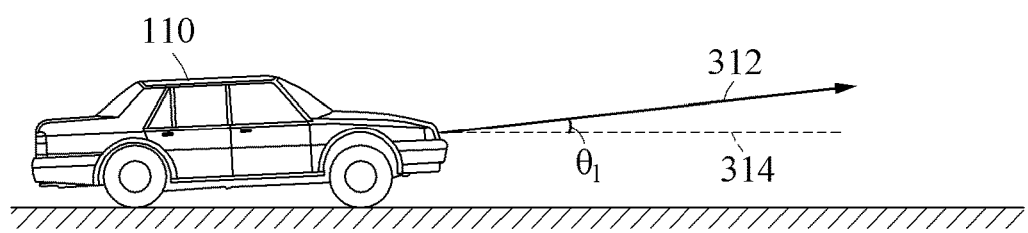
FIGS. 3 and 4 illustrate examples of a bird's eye image generated in an autonomous vehicle in an unstable posture.
Figure 3:
Figure 3:
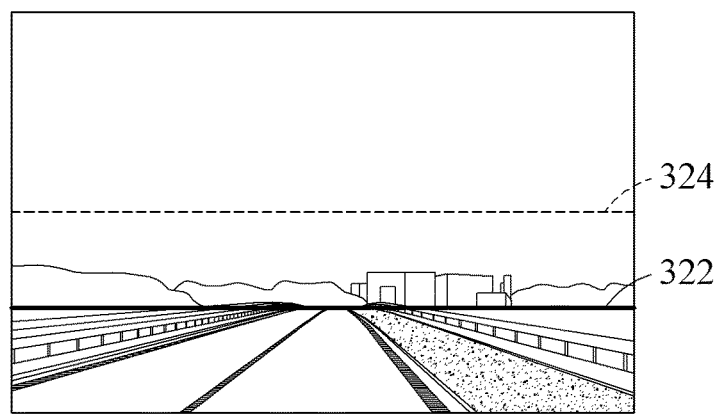
Figure 3:
Figure 3:
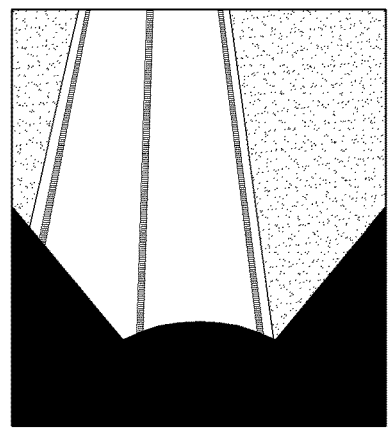
Figure 4:
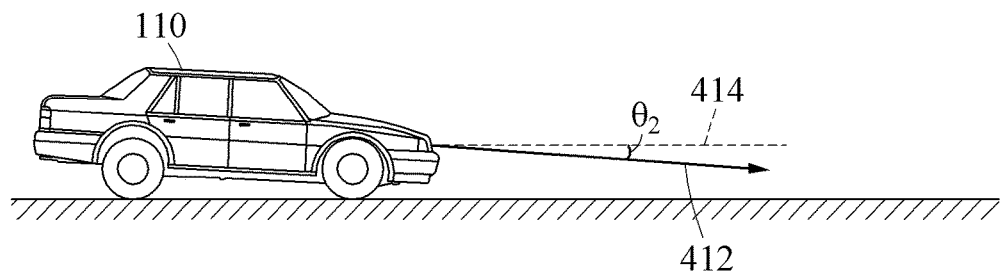
Figure 4:
Figure 4:
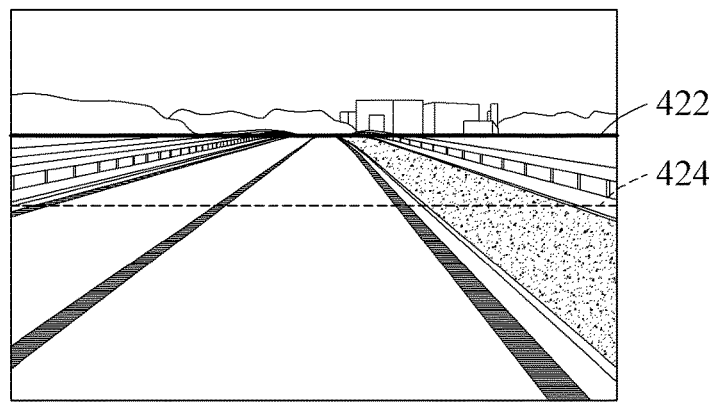
Figure 4:
Figure 4:
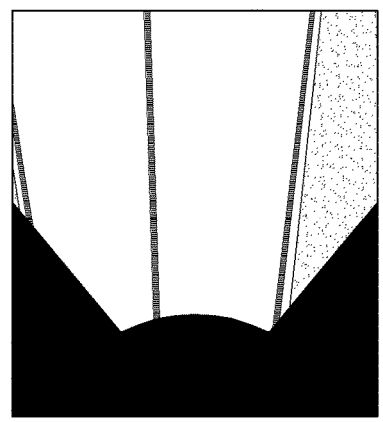

FIGS. 3 and 4 illustrate examples of bird's eye images 330 and 430 generated in an autonomous vehicle in an unstable posture.

During a driving operation, a posture of the autonomous vehicle 110 may be destabilized. For example, when the autonomous vehicle 110 starts driving, a front portion of the autonomous vehicle 110 is slightly lifted. Additionally, the front portion of the autonomous vehicle 110 may be slightly lifted when the front wheels of the autonomous vehicle 110 pass over a speed bump or other protruding surface on a road.

Referring to FIG. 3, in a case 310, an image 320 of a front view 312 is captured from the autonomous vehicle 110 while the front portion of the autonomous vehicle 110 is slightly lifted. The front view 312 has an angle $\theta_1$ greater than that of a front view 314 captured when a posture of the autonomous vehicle 110 is stable.

In the image 320 of the front view 312, a horizon 322 is lower than a center line 324 of the image 320.

The bird's eye image 330 is generated based on the image 320. The bird's eye image 330 differs from an actual road condition. For example, although the actual road condition corresponds to a level ground, the bird's eye image 330, which is generated in response to the autonomous vehicle 110 being in an unstable posture, represents a descending slope. Also, a distance represented in the bird's eye image 330 differs from an actual distance.

FIG. 4 illustrates another example in which the autonomous vehicle 110 is in an unstable posture. During a driving operation, a posture of the autonomous vehicle 110 may be destabilized. For example, when the autonomous vehicle 110 brakes during the driving operation, the autonomous vehicle 110 is inclined forward. The autonomous vehicle 110 may also be inclined forward when rear wheels of the autonomous vehicle 110 pass over a speed bump.

Referring to FIG. 4, in a case 410, an image 420 of a front view 412 is captured from the autonomous vehicle 110 while the autonomous vehicle 110 is inclined forward. The front view 412 has an angle $\theta_2$ less than that of a front view 414 captured when a posture of the autonomous vehicle 110 is stable.

In the image 420 of the front view 412, a horizon 422 is higher than a center line 424 of the image 420.

A bird's eye image 430 is generated based on the image 420. The bird's eye image 430 differs from an actual road condition. For example, although the actual road condition corresponds to a level ground, the bird's eye image 430 generated in response to the autonomous vehicle 110 being in an unstable posture represents an ascending slope. Also, a distance represented in the bird's eye image 430 differs from an actual distance.

Figure 5:
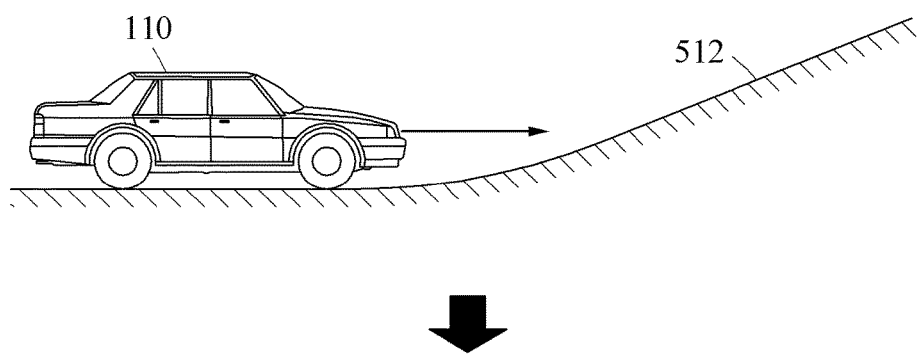
FIG. 5 illustrates an example of a slope determined to be an obstacle.
Figure 5:
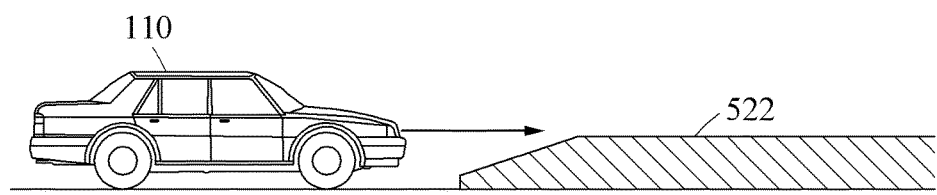

FIG. 5 illustrates an example of a slope 512 determined to be an obstacle 522. More specifically, in FIG. 5, the autonomous vehicle 110 recognizes the slope 512 as the obstacle 522, in addition to the examples of the autonomous vehicle 110 being in an unstable posture as described with reference to FIGS. 3 and 4.

As shown in FIG. 5, an actual road condition 510 is that the slope 512 is in front of the autonomous vehicle 110. In this example, the autonomous vehicle 110 recognizes the actual road condition 510, based on a bird's eye image of a front view, as a road condition 520 in which the obstacle 522 is in front of the autonomous vehicle 110. When the autonomous vehicle 110 recognizes that the obstacle 522 is located in front of the autonomous vehicle 110, the autonomous vehicle 110 may generate another route to avoid the obstacle 522 or fail to generate a driving route.

As indicated above, in response to the autonomous vehicle 110 inaccurately recognizing the actual road condition 510, an incorrect driving route may be generated. To prevent such an error, the posture of the autonomous vehicle 110 or a road gradient is used to generate a driving route. A method of calculating a gradient between the autonomous vehicle 110 and a ground, and a method of using the calculating gradient will be described below with reference to FIGS. 6 through 17.

Figure 6:
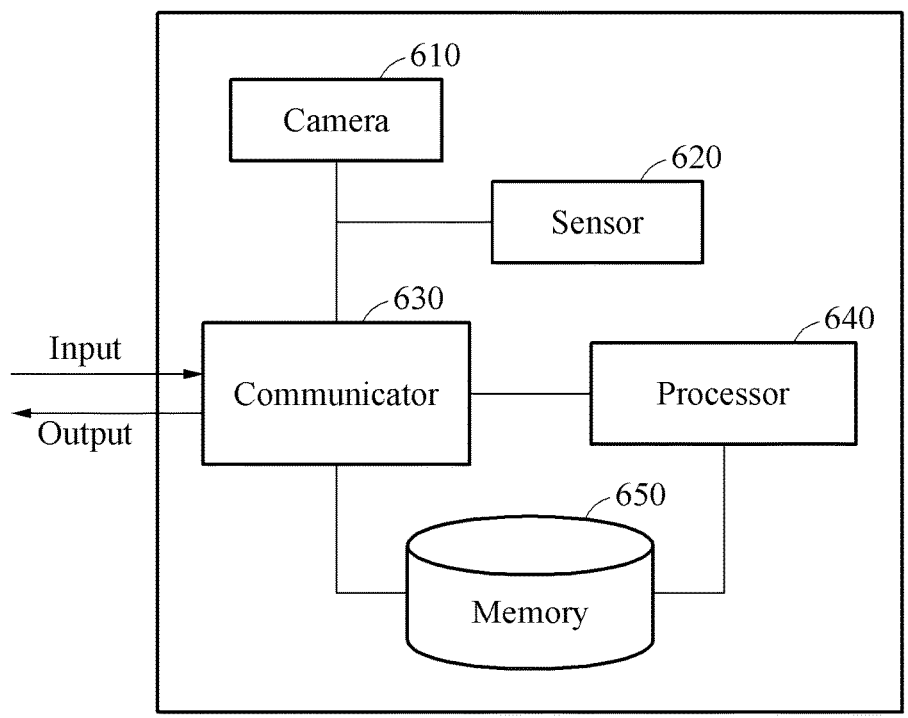
FIG. 6 illustrates an example of an apparatus for generating an autonomous driving route.

FIG. 6 illustrates an example of an apparatus 600 for generating an autonomous driving route.

Referring to FIG. 6, the apparatus 600 for generating an autonomous driving route includes a camera 610, a sensor 620, a communicator 630, a processor 640, and a memory 650. The apparatus 600 is, for example, included in the autonomous vehicle 110 described with reference to FIGS. 1 through 5.

The camera 610 acquires an input image by capturing a front view from a vehicle. The camera 610 is installed in the autonomous vehicle 110 such that an image captured by the camera 610 is perpendicular to a ground.

The sensor 620 includes one or more sensors. For example, the sensor 620 includes one or more voice recognizing sensors, a lidar sensor, a radar sensor, and an additional camera to capture an ambient view of the autonomous vehicle 110.

The communicator 630 is connected to the camera 610, the sensor 620, the processor 640, and the memory 650 to transmit and receive data. The communicator 630 may connect the apparatus 600 to an external device, and may be an interface. In an example, the communicator 630 is implemented as a circuitry in the apparatus 600 and includes an internal bus and an external bus. The communicator 630 is connected to the external device to transmit and receive data. For example, the communicator 630 receives data from the external device and transmits the data to the processor 640 and the memory 650.

The processor 640 processes data received by the communicator 630 and data stored in the memory 650.

The processor 640 is a data processing apparatus that is implemented by hardware including a circuit having a physical structure to perform desired operations. The desired operations may include a code or instructions included in a program. The processor 640 includes, for example, a microprocessor, a central processing unit, a processor core, a multi-core processor, a multiprocessor, an application-specific integrated circuit (ASIC), and a field programmable gate array (FPGA).

For example, the processor 640 executes a code stored in the memory 650, to be read by a computer, and performs operations based on instructions included in the code.

The memory 650 stores the data received by the communicator 630 and the data processed by the processor 640. For example, the memory 650 stores a program.

The memory 650 may include any one or any combination of any two or more of a volatile memory, a non-volatile memory, a random access memory (RAM), a flash memory, a hard disk drive, and an optical disk drive.

The memory 650 stores an instruction set, for example, software, that generates an autonomous driving route. The instruction set that generates the autonomous driving route is executed by the processor 640. The processor 640 generates the autonomous driving route based on the instruction set.

Hereinafter, the camera 610, the sensor 620, the communicator 630, the processor 640, and the memory 650 will be described in detail below with reference to FIGS. 7 through 17.

Figure 7:
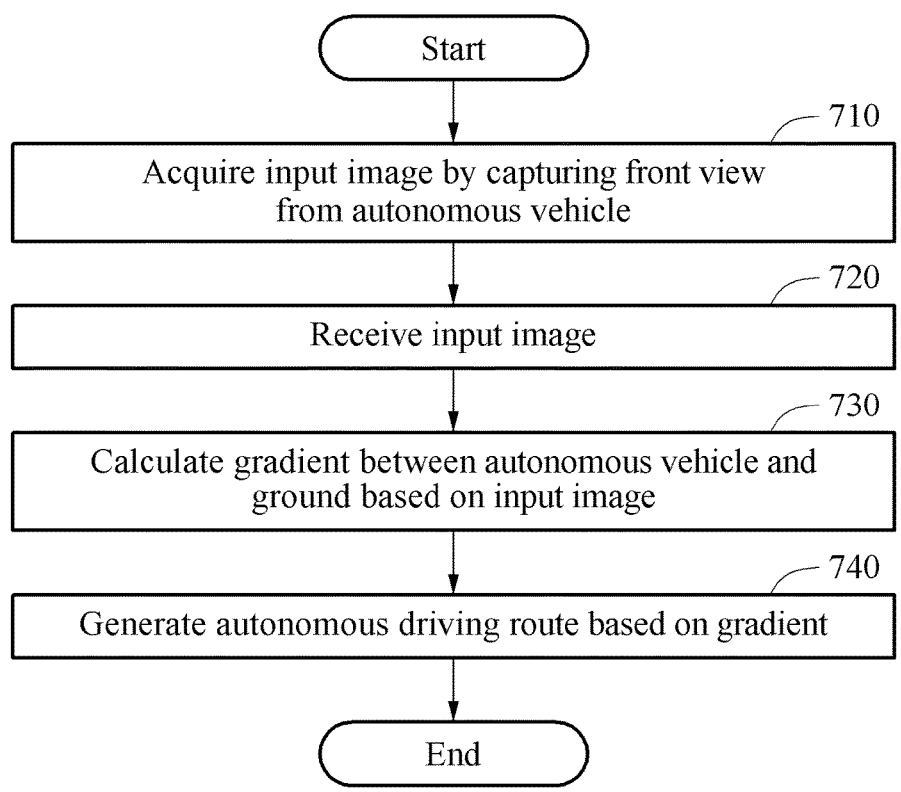
FIG. 7 illustrates an example of a method of generating an autonomous driving route.

FIG. 7 illustrates an example of a method of generating an autonomous driving route.

Referring to FIG. 7, in operation 710, the camera 610 acquires an input image by capturing a front view from the autonomous vehicle 110. The input image may be a color image. Operation 710 may be performed at intervals of a preset period. The camera 610 acquires images at intervals of the preset period.

In operation 720, the processor 640 receives the input image from the camera 610.

In operation 730, the processor 640 calculates a gradient between the autonomous vehicle 110 and a ground based on the input image. The gradient may be an angle between a view in front of the autonomous vehicle 110 and the ground. A method of calculating the gradient will be described in detail below with reference to FIGS. 9 through 14.

In operation 740, the processor 640 generates an autonomous driving route of the autonomous vehicle 110 based on the calculated gradient. A method of generating the autonomous driving route will be described in detail below with reference to FIG. 8.

Figure 8:
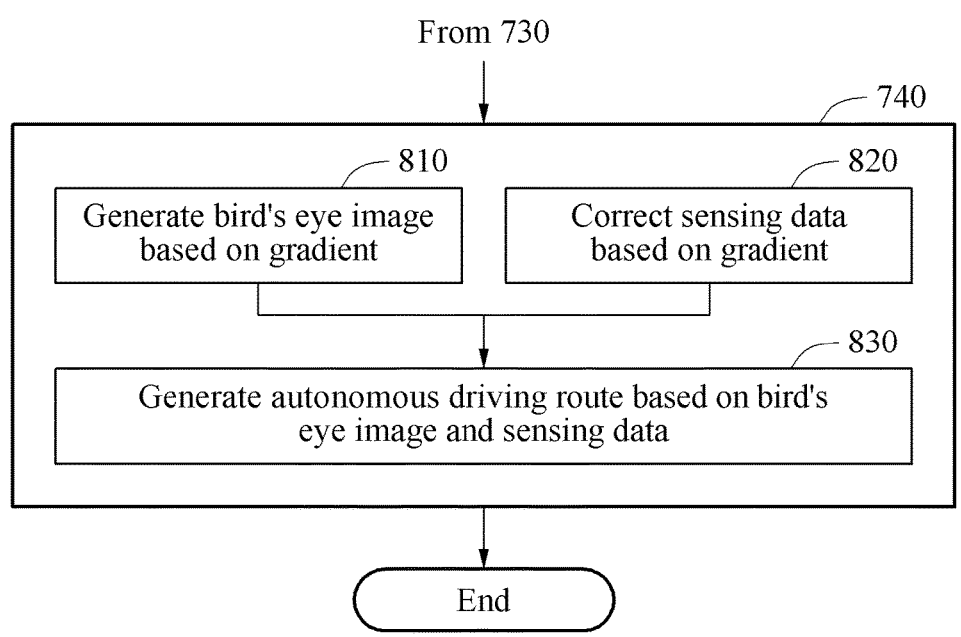
FIG. 8 illustrates an example of a method of generating an autonomous driving route based on a bird's eye image.

FIG. 8 illustrates an example of a method of generating an autonomous driving route based on a bird's eye image.

Referring to FIG. 8, in operation 810, the processor 640 generates a bird's eye image based on a calculated gradient. For example, the processor 640 generates the bird's eye image by warping an input image into the bird's eye view.

In operation 820, the processor 640 corrects sensing data based on the calculated gradient. The sensing data is received from the sensor 620 and is associated with the gradient.

In operation 830, the processor 640 generates an autonomous driving route based on the bird's eye image and the sensing data.

Figure 9:
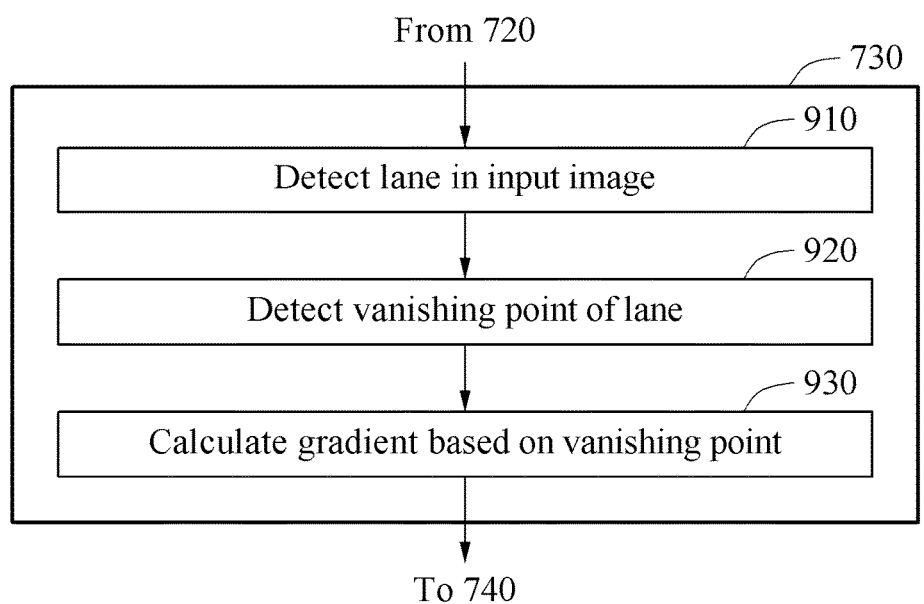
FIG. 9 illustrates an example of a method of calculating a gradient based on an input image.

FIG. 9 illustrates an example of a method of calculating a gradient based on an input image. As illustrated in FIG. 9, operation 730 of FIG. 7 includes operations 910, 920, and 930.

In operation 910, the processor 640 detects one or more lanes in an input image. For example, the processor 640 detects a side lane and a center lane from the input image.

In operation 920, the processor 640 detects a vanishing point of the lanes. For example, the processor 640 detects a point at which the detected lanes intersect as the vanishing point.

In operation 930, the processor 640 calculates a gradient based on the detected vanishing point. A method of calculating the gradient based on the vanishing point will be described in detail below with reference to FIGS. 13 and 14.

Figure 10:
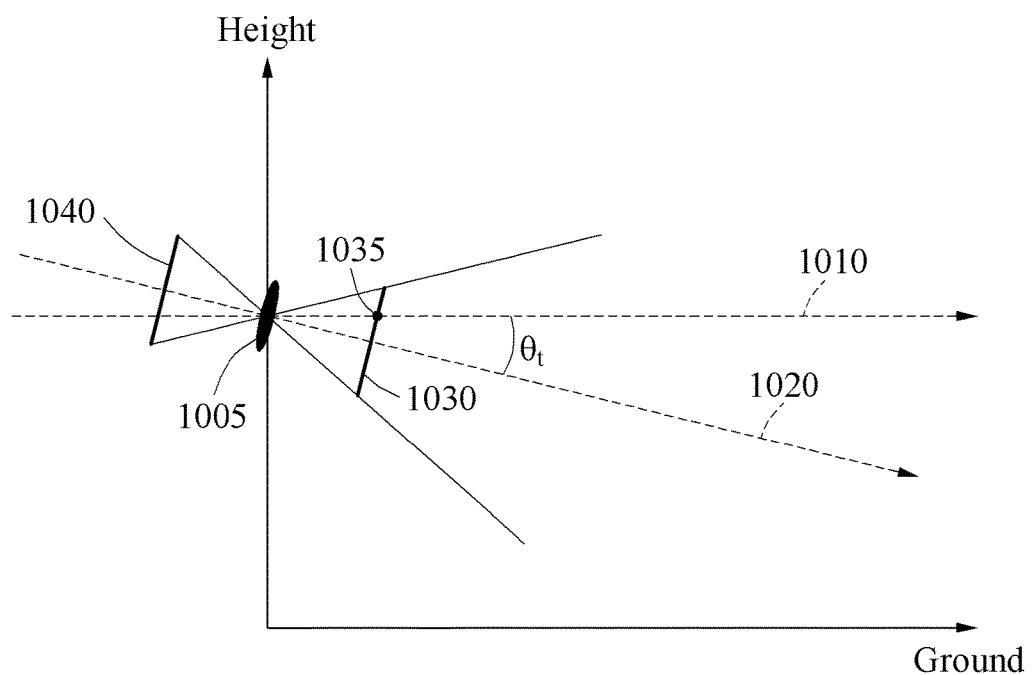
FIG. 10 illustrates an example of a capturing system of a camera when an autonomous vehicle is inclined forward.

FIG. 10 illustrates an example of a capturing system 1000 of the camera 610 of FIG. 6 when an autonomous vehicle is inclined forward.

Referring to FIG. 10, the capturing system 1000 of the camera 610 acquires an input image 1040 by capturing a front view 1030 based on a lens 1005 and a tilted axis 1020 of the lens 1005.

When the autonomous vehicle 110 is inclined forward or when a front portion of the autonomous vehicle is moved downward, the lens 1005 of the camera 610 is inclined based on an angle at which the autonomous vehicle 110 is inclined, and the tilted axis 1020 of the lens 1005 is tilted downward. In this example, an initial axis 1010 and the tilted axis 1020 of the lens 1005 on the ground have an angle $\theta_t$ therebetween. The angle $\theta_t$ is also referred to as a gradient. The camera 610 acquires the input image 1040 by capturing the front view 1030 along the tilted axis 1020 of the lens 1005. A vanishing point occurs on a line 1035 at which the front view 1030 intersects with the initial axis 1010. The line 1035 may be a horizon.

The foregoing description is also applicable to a case in which the autonomous vehicle 110 is inclines backward or slightly lifted at the front end. It is understood that a tilted axis of the lens 1005 is higher than the axis 1010 when the autonomous vehicle 110 is inclined backward.

Figure 11:
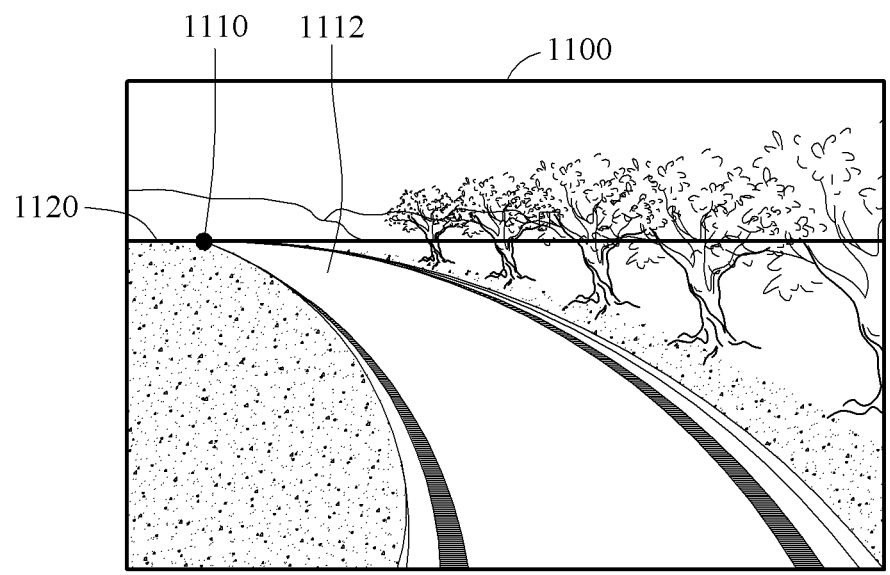
FIG. 11 illustrates an example of an input image captured when a road is curved.

FIG. 11 illustrates an example of an input image 1100 captured when a road 1112 is curved.

Referring to FIG. 11, the processor 640 detects a point of intersection of lanes as a vanishing point 1110. A horizon 1120 includes the vanishing point 1110. Since the point of intersection of the lanes is detected as the vanishing point 1110, the processor 640 detects the vanishing point 1110 irrespective of whether the lanes are straight lines or curved lines.

Figure 12:
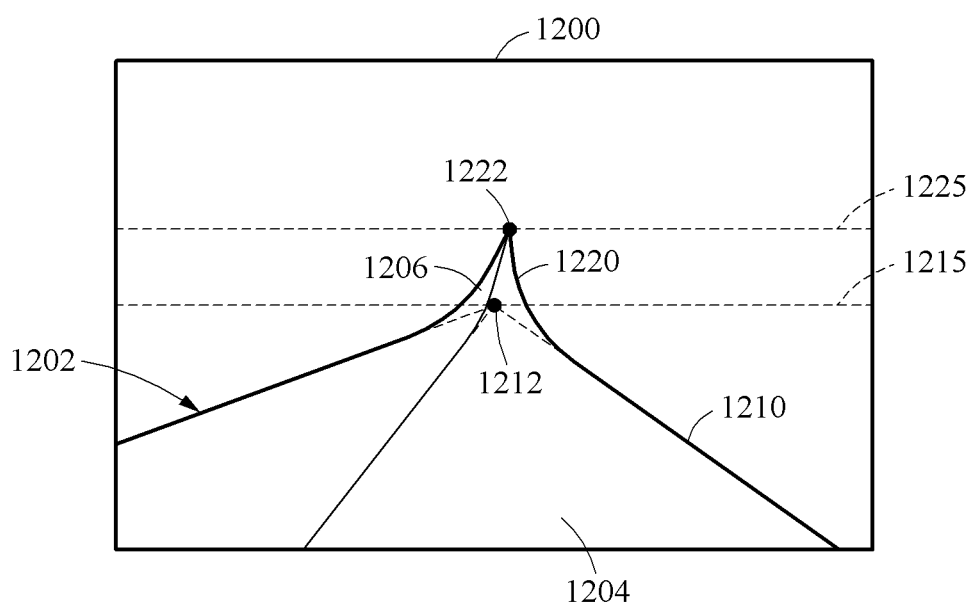
FIG. 12 illustrates an example of an input image including a plurality of vanishing points.

FIG. 12 illustrates an example of an input image 1200 including a plurality of vanishing points.

Referring to FIG. 12, a road 1202 includes a level ground 1204 and an ascending slope 1206. The processor 640 detects a first vanishing point 1212 of a first road line 1210 on the level ground 1204 and detects a second vanishing point 1222 of a second road line 1220 on the ascending slope 1206. The first vanishing point 1212 is on a first line 1215 transverse to the road 1202 and the second vanishing point 1222 is on a second line 1225 transverse to the road 1202. Compared to the second road line 1220, the first road line 1210 is closest to the autonomous vehicle 110.

When multiple vanishing points are detected, the processor 640 determines the first vanishing point that is closest to the autonomous vehicle 110 to be a vanishing point used to calculate a gradient. In this example, the processor 640 detects the first vanishing point 1212 and the second vanishing pint 1222, and selects the first vanishing point 1212 of the first road line 1210, which is closest to the autonomous vehicle 110, to calculate the gradient.

Figure 13:
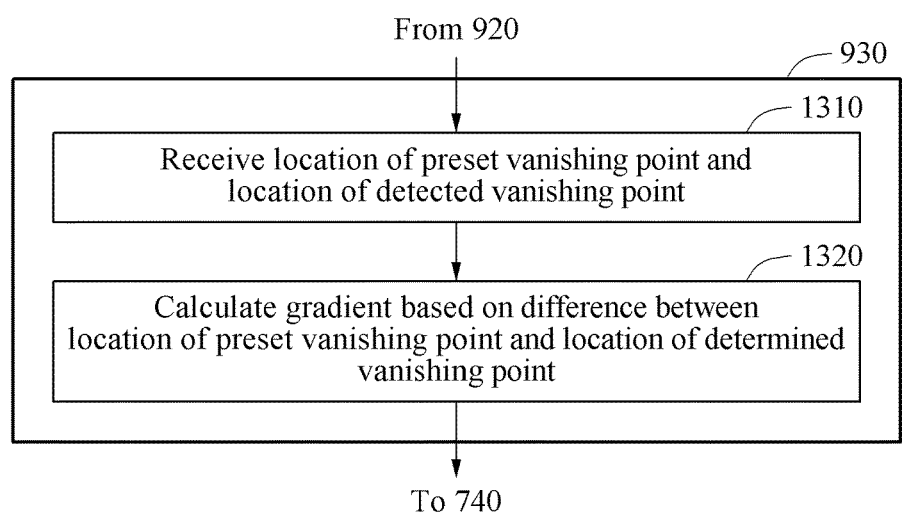
FIG. 13 illustrates an example of a method of calculating a gradient based on a vanishing point.

FIG. 13 illustrates an example of a method of calculating a gradient based on a vanishing point.

Referring to FIG. 13, operation 930, described in FIG. 9, includes operations 1310 and 1320.

In operation 1310, the processor 640 receives a location of a preset vanishing point and a location of a detected vanishing point. For example, the processor 640 receives a height coordinate of the preset vanishing point and a height coordinate of the detected vanishing point. The height coordinate of the preset vanishing point may be a height coordinate of a center of an image. The height coordinate of the preset vanishing point and the height coordinate of the detected vanishing point will be described with reference to FIG. 14.

In operation 1320, the processor 640 calculates a gradient based on a difference between the location of the preset vanishing point and the location of the detected vanishing point. A matching table that matches the gradient and the difference between the location of the preset vanishing point and the location of the determined vanishing point is stored in the memory 650. Also, the gradient is calculated according to Equation 1, provided below. For example, the difference between the location of the preset vanishing point and the location of the determined vanishing point is a distance represented on an image and, thus, the difference between the location of the preset vanishing point and the location of the determined vanishing point is used to calculate $v_y$, $v_y$ being an actual distance. $f_y$ is an actual distance between the determined vanishing point and a lens of a camera. $v_y$ may also be the distance between the location of the preset vanishing point and the location of the determined vanishing point on an image, and $f_y$ may also be a distance between the determined vanishing point to a lens in an image capturing system.

$$\text{Gradient}(\theta) = \tan^{-1} \frac{vy}{fy} \qquad \text{[Equation 1]}$$

Figure 14:
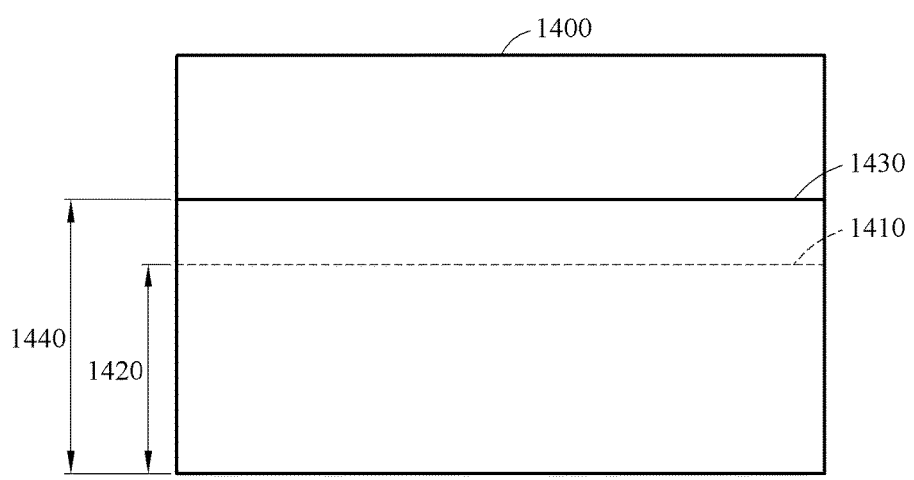
FIG. 14 illustrates an example of a height coordinate of a preset vanishing point and a height coordinate of a calculated vanishing point.

FIG. 14 illustrates an example of a height coordinate of a preset vanishing point and a height coordinate of a calculated vanishing point.

Referring to FIG. 14, a preset vanishing point is on a center line 1410 of an input image 1400. A height coordinate 1420 of the center line 1410 is set to include a vanishing point of an image captured on a level ground. For example, when a resolution of the input image is 1920×1080, $540^{th}$ or $541^{th}$ pixels from a bottom are included in the center line 1410.

Input images captured at the same gradient have vanishing points in a vanishing line 1430 irrespective of a shape of a road line. For example, when the same gradient is set, a difference between the height coordinate 1420 of the preset vanishing point and a height coordinate 1440 of a calculated vanishing point is constant.

Figure 15:
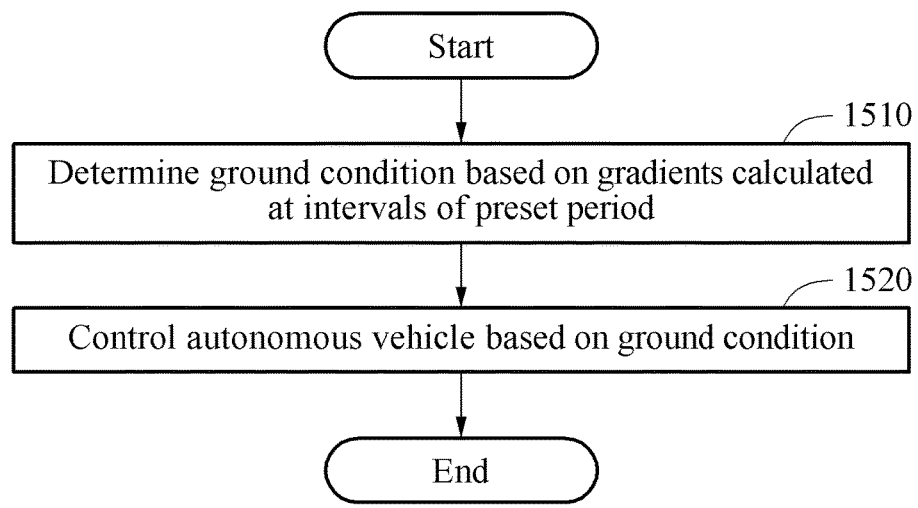
FIG. 15 illustrates an example of a method of controlling an autonomous vehicle based on a condition of a ground.

FIG. 15 illustrates an example of a method of controlling an autonomous vehicle based on a condition of a ground.

Referring to FIG. 15, operations 1510 and 1520 are performed, for example, in parallel with operation 740 of FIG. 7.

In operation 1510, the processor 640 determines a ground condition based on gradients calculated at intervals of a preset period. The gradients are calculated when operations 710, 720, and 730 are performed at intervals of the preset period. The processor 640 calculates deviations between the gradients. The processor 640 determines the ground condition based on the calculated deviations. The ground condition is set for each deviation range among deviation ranges.

In operation 1520, the processor 640 controls the autonomous vehicle 110 based on the determined ground condition. For example, a speed of driving decreases as the ground condition becomes more uneven.

Figure 16:
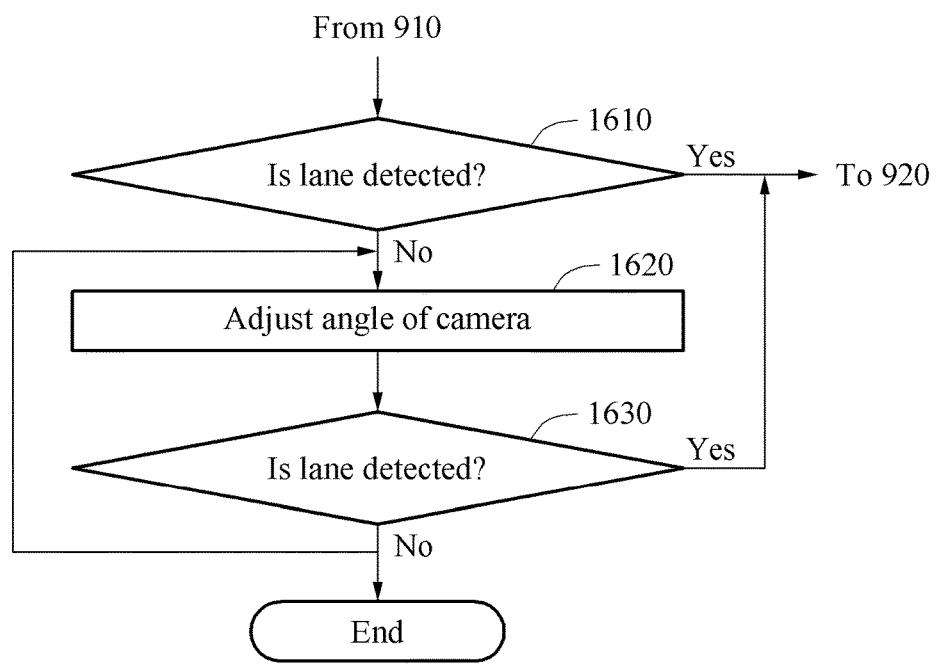
FIG. 16 illustrates an example of a method of detecting a lane by adjusting a tilting angle of a camera.

FIG. 16 illustrates an example of a method of detecting a lane by adjusting a tilting angle of the camera 610.

Referring to FIG. 16, operations 1610, 1620, and 1630 are performed after operation 910 of FIG. 9 is performed.

In operation 1610, the processor 640 determines whether a lane is detected from an input image.

In operation 1620, the processor 640 adjusts a tilting angle of the camera 610 when the lane is not detected. When a slope of a road on which the autonomous vehicle 110 is located changes from an ascending slope to a descending slope, the camera 610, which is mounted on a front side of the autonomous vehicle 110, may not capture the road. In this example, the processor 640 adjusts an axis of a lens of the camera 610 downward. In response to an adjustment of the tilting angle, the camera 610 acquires an input image.

In operation 1630, the processor 640 determines whether a lane is detected from the input image acquired by the camera 610 after the tilting angle is adjusted. When the lane is detected from the input image, operation 920 of FIG. 9 is performed.

When the tilting angle of the camera 610 is adjusted, the processor 640 corrects a location of a detected vanishing point in operation 920. The processor 640 corrects the location of the vanishing point using a value corresponding to the adjusted tilting angle of the camera 610.

When the tilting angle of the camera 610 is adjusted, the processor 640 corrects a calculated gradient in operation 930. The processor 640 corrects the calculated gradient using the value corresponding to the adjusted tilting angle of the camera 610.

Figure 17:
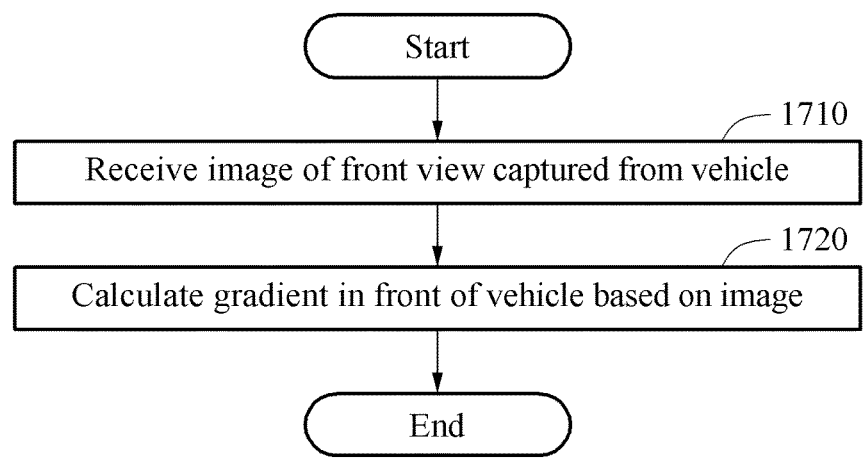
FIG. 17 illustrates an example of a method of calculating a gradient of a front view.

FIG. 17 illustrates an example of a method of calculating a gradient in a front view.

The apparatus 600 of FIG. 6 calculates a gradient in front of the autonomous vehicle 110 when the apparatus 600 does not generate an autonomous driving route.

Referring to FIG. 17, in operation 1710, the processor 640 receives an image of a front view captured from a vehicle. The camera 610 acquires the image by capturing the front view from the vehicle, and the processor 640 receives the image from the camera 610. The received image corresponds to the input image described with reference to FIG. 6.

In operation 1720, the processor 640 calculates the gradient in front of the vehicle based on the received image. The gradient may be an angle between the autonomous vehicle 110 and a ground. Since the descriptions of FIGS. 9 through 14 are applicable here, repeated description of operation 1720 will be omitted.

The sensor 620, the communicator 630, the processor 640, and the memory 650 in FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 and 7-17 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to generate an autonomous driving route of an autonomous vehicle, the method comprising:
   receiving an input image of a front view captured from the autonomous vehicle;
   calculating a gradient between the autonomous vehicle and a ground based on the input image; and
   generating the autonomous driving route based on the calculated gradient,
   wherein the calculating of the gradient comprises:
     detecting a lane marking in the input image,
     detecting a vanishing point based on the lane marking, and
     calculating the gradient based on the vanishing point.

2. The method of claim 1, wherein the generating of the autonomous driving route comprises:
   generating a bird's eye image by converting a viewpoint of the input image into a bird's eye view based on the gradient; and
   generating the autonomous driving route based on the bird's eye image.

3. The method of claim 1, further comprising:
   correcting data acquired by sensing an ambient environment of the autonomous vehicle using the gradient,
   wherein the generating of the autonomous driving route comprises using the corrected data.

4. The method of claim 1, wherein the detecting the vanishing point comprises detecting a plurality of vanishing points, and detecting a first vanishing point closest to the autonomous vehicle, among the plurality of vanishing points, as the vanishing point for the calculating the gradient.

5. The method of claim 1, wherein the calculating of the gradient based on the vanishing point comprises:
   receiving a location of a preset vanishing point and a location of the detected vanishing point; and
   calculating the gradient based on a difference between the location of the preset vanishing point and the location of the detected vanishing point.

6. The method of claim 5, wherein the receiving of the location of the preset vanishing point and the location of the detected vanishing point comprises receiving a height coordinate of the preset vanishing point and a height coordinate of the detected vanishing point in the input image.

7. The method of claim 6, wherein the height coordinate of the preset vanishing point is a center height coordinate of the input image.

8. The method of claim 1, further comprising:
determining a condition of the ground based on gradients calculated at intervals of a preset period; and
controlling the autonomous vehicle based on the determined condition of the ground.

9. The method of claim 8, wherein the determining of the condition of the ground comprises determining the condition of the ground based on a deviation between the gradients.

10. A non-transitory computer-readable medium storing program instructions that, when executed by a processor, cause the processor to perform the method of claim 1.

11. An apparatus to generate an autonomous driving route of an autonomous vehicle, the apparatus comprising:
a processor configured to
receive an input image of a front view captured from the autonomous vehicle,
calculate a gradient between the autonomous vehicle and a ground based on the input image, and
generate the autonomous driving route based on the calculated gradient,
wherein the processor is configured to calculate the gradient by:
detecting a lane marking in the input image,
detecting a vanishing point based on the lane marking, and
calculating the gradient based on the vanishing point.

12. The apparatus of claim 11, further comprising:
a camera configured to acquire the input image by capturing the front view from the autonomous vehicle.

13. The apparatus of claim 11, wherein the generating of the autonomous driving route comprises
generating a bird's eye image by converting a viewpoint of the input image into a bird's eye view based on the gradient, and
generating the autonomous driving route based on the bird's eye image.

14. The apparatus of claim 11, wherein
the generating of the autonomous driving route comprises
correcting data acquired by sensing an ambient environment of the autonomous vehicle using the gradient, and
the corrected data is used to generate the autonomous driving route.

15. The apparatus of claim 11, wherein the detecting the vanishing point comprises detecting a plurality of vanishing points, and detecting a first vanishing point closest to the autonomous vehicle, among the plurality of vanishing points, as the vanishing point for the calculating the gradient.

16. The apparatus of claim 11, wherein the calculating of the gradient based on the vanishing point comprises
receiving a location of a preset vanishing point and a location of the detected vanishing point, and
calculating the gradient based on a difference between the location of the preset vanishing point and the location of the detected vanishing point.

17. The apparatus of claim 16, wherein the receiving of the location of the preset vanishing point and the location of the detected vanishing point comprises calculating a height coordinate of the preset vanishing point and a height coordinate of the detected vanishing point in the input image.

18. The apparatus of claim 17, wherein the height coordinate of the preset vanishing point is a center height coordinate of the input image.

19. The apparatus of claim 11, wherein the processor is further configured to
determine a condition of the ground based on gradients calculated at intervals of a preset period, and
control the autonomous vehicle based on the determined state of the ground.

20. The apparatus of claim 19, wherein the determining of the condition of the ground comprises determining the condition of the ground based on a deviation between the gradients.

21. A vehicle control method, comprising:
receiving an input image of a front view captured from a vehicle;
calculating a gradient of the front view based on the input image; and
autonomously controlling a driving operation of the vehicle based on the gradient,
wherein the calculating the gradient comprises:
detecting a lane marking in the input image,
detecting a vanishing point based on the lane marking, and
calculating the gradient based on the vanishing point.

22. A vehicle control apparatus, comprising:
a processor configured to:
receive an input image of a front view captured from an autonomous vehicle, calculate a gradient of the front view based on the input image, and
control a driving operation of the autonomous vehicle based on the gradient,
wherein the processor is configured to calculate the gradient by:
detecting a lane marking in the input image,
detecting a vanishing point based on the lane marking, and
calculating the gradient based on the vanishing point.

23. The vehicle control apparatus of claim 22, further comprising a memory storing program instructions executable by the processor to cause the processor to receive the input image, calculate the gradient, and control the driving operation of the autonomous vehicle.

24. A vehicle control method, comprising:
detecting a location of a vanishing point in an image captured by a camera of a vehicle;
calculating a gradient between the vehicle and a ground based on the location of a preset vanishing point and the location of the detected vanishing point; and
autonomously controlling a driving operation of the vehicle based on the gradient.

25. The vehicle control method of claim 24, wherein the detected vanishing point is a vanishing point of a lane marking.

26. The vehicle control method of claim 24, wherein the location of the detected vanishing point comprises a height coordinate of the detected vanishing point, and wherein the location of the preset vanishing point comprises a center height coordinate of the image.

27. The vehicle control method of claim 24, wherein the controlling of the driving operation of the vehicle comprises
converting the image captured by the camera into a bird's eye view image based on the gradient,
generating an autonomous driving route based on the bird's eye view image, and
controlling the driving operation of the vehicle based on the autonomous driving route.

* * * * *